(12) United States Patent
Bachet et al.

(10) Patent No.: US 10,127,708 B2
(45) Date of Patent: Nov. 13, 2018

(54) MANAGEMENT OF A PLURALITY OF GRAPHIC CARDS

(71) Applicant: DASSAULT SYSTEMES, Velizy Villacoublay (FR)

(72) Inventors: Victor Bachet, Boulogne Billancourt (FR); Nicolas Jean, Velizy-Villacoublay (FR); Nicolas Colombe, Massy (FR)

(73) Assignee: DASSAULT SYSTEMES, Velizy Villacoublay (FR)

( * ) Notice: Subject to any disclaimer, the term of this patent is extended or adjusted under 35 U.S.C. 154(b) by 0 days.

(21) Appl. No.: 15/393,675

(22) Filed: Dec. 29, 2016

(65) Prior Publication Data
US 2017/0186214 A1   Jun. 29, 2017

(30) Foreign Application Priority Data

Dec. 29, 2015   (EP) .................................... 15307166

(51) Int. Cl.
*G06T 15/00* (2011.01)
*G06F 9/50* (2006.01)
*G09G 5/36* (2006.01)

(52) U.S. Cl.
CPC .......... *G06T 15/005* (2013.01); *G06F 9/5011* (2013.01); *G09G 5/36* (2013.01); *G06T 2210/52* (2013.01)

(58) Field of Classification Search
CPC ..... G06T 2210/52; G06T 15/005; G09G 5/36; G06F 9/5011
USPC ......................................................... 345/419
See application file for complete search history.

(56) References Cited

U.S. PATENT DOCUMENTS

| | | | | |
|---|---|---|---|---|
| 9,672,583 | B2* | 6/2017 | Lin | G06T 1/60 |
| 9,697,579 | B2* | 7/2017 | Taggart | G06T 1/20 |
| 9,760,376 | B1* | 9/2017 | Bequet | G06F 9/30145 |
| 2006/0139360 | A1* | 6/2006 | Panesar | G06F 12/1081 |
| | | | | 345/568 |
| 2006/0190942 | A1* | 8/2006 | Inoue | G06F 9/4856 |
| | | | | 718/100 |
| 2007/0052715 | A1* | 3/2007 | Levit-Gurevich | G06F 9/545 |
| | | | | 345/542 |

(Continued)

OTHER PUBLICATIONS

Extended European Search Report dated Apr. 11, 2016 in Patent Application No. 15307165.9.

(Continued)

*Primary Examiner* — Phu K Nguyen
(74) *Attorney, Agent, or Firm* — Oblon, McClelland, Maier & Neustadt, L.L.P.

(57) ABSTRACT

The invention notably relates to a computer-implemented method for managing a plurality of graphic cards, a graphic card comprising one or more graphic processing units, comprising loading a scene in a Render Engine, the scene comprising at least one graphic data to be used for rendering a view of the scene; creating an abstract graphic resource for a graphic resource of the at least one graphic data, the abstract graphic resource storing an identifier of a graphic resource for at least one of graphic card; copying, on the said at least one graphic card, the said graphic resource of the at least one graphic data; providing to the Render Engine with an access to the abstract graphic resource for handling the said graphic resource.

12 Claims, 4 Drawing Sheets

(56) References Cited

U.S. PATENT DOCUMENTS

| | | | |
|---|---|---|---|
| 2008/0211816 A1* | 9/2008 | Gonzalez | G06F 3/14 345/505 |
| 2009/0187902 A1* | 7/2009 | Serebrin | G06F 9/455 718/1 |
| 2011/0246171 A1* | 10/2011 | Cleeton | G06F 9/45558 703/25 |
| 2012/0001925 A1* | 1/2012 | Andonieh | G06F 9/5083 345/502 |
| 2012/0159039 A1* | 6/2012 | Kegel | G06F 12/1009 711/6 |
| 2014/0354667 A1 | 12/2014 | Lin et al. | |
| 2014/0368516 A1 | 12/2014 | Taggart et al. | |

OTHER PUBLICATIONS

Extended European Search Report dated Apr. 11, 2016 in Patent Application No. 15307166.7.

\* cited by examiner

MANAGEMENT OF A PLURALITY OF GRAPHIC CARDS

CROSS-REFERENCE TO RELATED APPLICATIONS

This application claims priority under 35 U.S.C. § 119 or 365 to European Application No. 15307166.7, filed Dec. 29, 2015. The entire contents of the above application(s) are incorporated herein by reference.

FIELD OF THE INVENTION

The invention relates to the field of computer programs and systems, and more specifically to a method, system and program for managing a plurality of graphic cards.

BACKGROUND

Computer Graphics techniques for rendering a three-dimensional (3D) scene aims at drawing the 3D scene on a display device such as a computer screen, a television, a projector, . . . . Rendering a 3D scene is also referred to as 3D rendering.

Computer Graphics techniques for 3D rendering rely on hardware and software components that interact one each other's, and these components form an architecture dedicated to 3D rendering. The main hardware component of this architecture is the Graphic Card (GC) that is an accelerator designed to make some type of calculation faster. The GC is specialized in graphics computations such as converting a triangle into pixels. The GC comprises one or more Graphic Processing Units (GPUs); a GPU is a chip that performs the graphics computations of the GC. The GC can be connected to one or several display devices that display the result of the 3D rendering. Instructions to the GC and the GPU are sent through a Graphic Library (GL) that is a computer program library designed to aid in rendering computer graphics to a monitor. The GL is executed (or run) by the Central Processing Unit (CPU) of the computer hosting the GC. The two most famous GL are DirectX© and OpenGL©. In practice, the GL is not written by the hardware manufacturer, but rather by a third party that will developed the GL in accordance with the hardware specifications provided by the hardware manufacturer. A Render Engine (RE) is a framework that takes a 3D scene as an input and draw it to the screen with the use of one or more GC (in case of Multi Graphic Card rendering). The 3D scene is created by an application that uses the RE framework. The RE translates information provided by the application into Graphics Resources (GR). A GR is an object furnished by the GL on which operations can be performed such buffers, textures . . . Graphic Driver (GD), is a computer program that provides an interface to allow communications between the Operating System (OS) and the GC. In practice, GD are provided by GC manufacturers.

Multi GC rendering is the ability for an application to render a scene with the use of several GCs, plugged in on a same motherboard. Despite Multi GC principles are recent, only few applications use it because it involves a lot of complexity in the RE framework.

Figure 1:
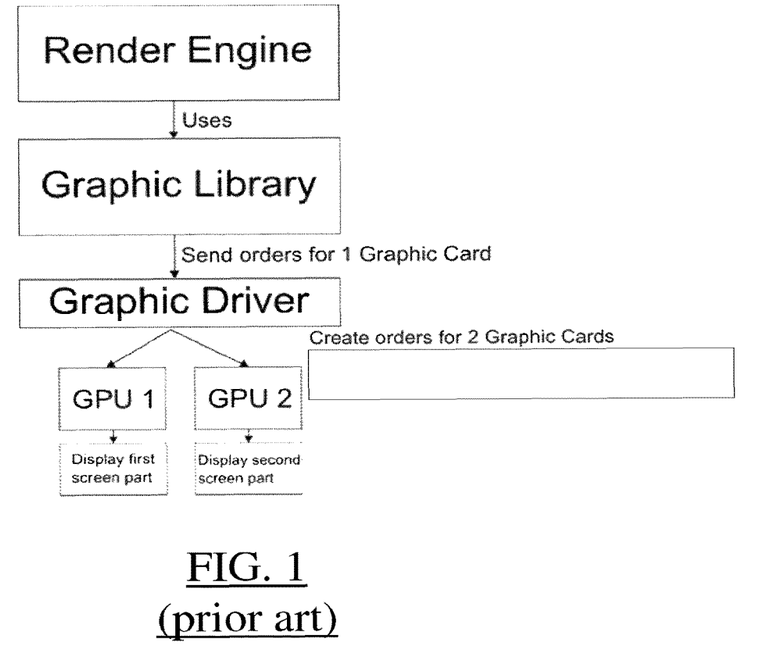
FIG. 1 shows a flowchart of a prior art method for performing a multi GC display.

There are two common techniques to achieve multi Graphic Card rendering. Both rely on the Graphic Driver work and not on the Render Engine framework. The first technique uses SLI™ that was developed by nVIDIA™ or CrossFire™ that was developed by AMD™. Basically, when the RE of an application is rendering one frame, the RE uses the GL as if there was only one GC inside the computer. The RE is not aware that there are several GCs. The GD receives the orders and spread them to the GC. This illustrated on FIG. 1 that shows an example of a computer with two GCs wherein one GC renders the upper part of the screen and the second GC renders the bottom part. The RE receives from the application orders that are translated into GR (e.g. buffer, textures . . . ) received by the GL, which in turn sends orders for one GC. The GD managing the two cards (GC1, GC2) creates orders for the two GC using the SLI™/CrossFire™ technologies so that each GPU of each GC (GPU 1 of GC1, GPU2 of GC2) knows what information to process.

The second technique is based on the first one and is referred to as Mosaic mode. The Mosaic mode describes the ability to render at a higher resolution, using the display driver to spread the result to multiple screens. The combination of the Mosaic mode with the first techniques discussed above provides the capability for each GC to handle a separate display.

These first and second techniques are mostly used in game applications to improve performances or in flying simulator to output to more than one display with reasonable performances.

In addition to these two techniques, another technique provides specific Multi GCs by exposing rendering features by the GL. This technical is however experimental and not exploited by the hardware and software manufacturers.

These techniques of multi GCs rendering suffers several drawbacks. The first one is that they are limited to specific scenarios: the Mosaic mode for multiscreen rendering and SLI™/CrossFire™ for video games. Indeed, these techniques rely on the GD capabilities to dispatch orders to the GCs; however, the GD do not know at each time all the information required for performing the dispatch so that these solutions apply on few scenarios retained by the application developers. For instance, in a non-retained scenario only one GC is used; the application cannot benefit of the computing resources of the other GCs.

Another limitation is that these techniques are limited to one point of view on the rendered 3D scene. Hence, it is not possible to exploit the computing resources of the GPU for computing in parallel several viewpoints, which would improve the display speed of the 3D scene when changing of viewpoint.

A further limitation is that it is not possible to address a particular order to a particular GC, and it is not possible to expose this particular order to the RE. As explained above, the RE is not aware that there are several GCs.

Within this context, there is still a need for an improved management of multiple GCs. Notably, the GCs allow to render a 3D scene with multiple viewpoints on several display devices.

SUMMARY OF THE INVENTION

It is therefore provided a computer-implemented method for managing a plurality of graphic cards. A graphic card comprises one or more graphic processing units. The method comprises loading a scene in a Render Engine, the scene comprising at least one graphic data to be used for rendering a view of the scene; creating an abstract graphic resource for a graphic resource of the at least one graphic data, the abstract graphic resource storing an identifier of a graphic resource for at least one of graphic card; copying, on the said at least one graphic card, the said graphic resource of the at least one graphic data; providing to the Render Engine with an access to the abstract graphic resource for handling the said graphic resource.

The method may comprise one or more of the following:
the Render Engine comprises at least two logical layers, an upper layer providing to an application with access to the Render Engine and a lower layer providing the Render Engine with access to a graphic library, and wherein the creation of the abstract graphic resource is performed by an abstract layer comprised between the upper layer and the lowest layer;
before the creation of the abstract graphic resource: accessing on a graphic library, by the lower layer, the identifier of the graphic resource for the at least one of graphic cards; and providing the accessed identifier to the abstract layer;
the created abstract graphic resource stores the identifier of a graphic resource and an identifier of the at least one of graphic card;
the step of creating the abstract graphic resource further comprises storing the abstract graphic resource in a table; and wherein the step of providing to the Render Engine with an access comprises providing to the Render Engine with an access to the table that stores the abstract graphic resource for handling the said graphic resource;
receiving a graphic library action to be executed on the said graphic resource, the action being required by an application with access to the Render Engine; identifying the abstract graphic resource created for the said graphic resource; retrieving the identifier of the graphic resource for at least one of graphic card; and accessing the graphic resource and executing the graphic library action on the graphic resource;
receiving an order to deleted the said graphic resource, the action being required by an application with access to the Render Engine; identifying the abstract graphic resource created for the said graphic resource; retrieving the identifier of the graphic resource for the at least one of graphic card; and accessing the graphic resource and deleting the graphic resource of the at least one of graphic card;
providing to the upper layer the abstract graphic resource;
before creating an abstract resource: selecting the at least one graphic card for handling the at least one graphic resource to be used;
the abstract graphic resource stores an identifier of a graphic resource for each graphic card of the plurality of graphic cards, and wherein the graphic resource is copied on each graphic card of the plurality of graphic cards.

It is further provided a Render Engine computer program comprising instructions for performing the method.

It is further provided a computer readable storage medium having recorded thereon the Render Engine computer program.

It is further provided a system comprising processing circuitry coupled to a memory and a graphical user interface, the memory having recorded thereon the Render Engine computer program.

BRIEF DESCRIPTION OF THE DRAWINGS

Embodiments of the invention will now be described, by way of non-limiting example, and in reference to the accompanying drawings, where.

DETAILED DESCRIPTION OF THE INVENTION

Figure 2:
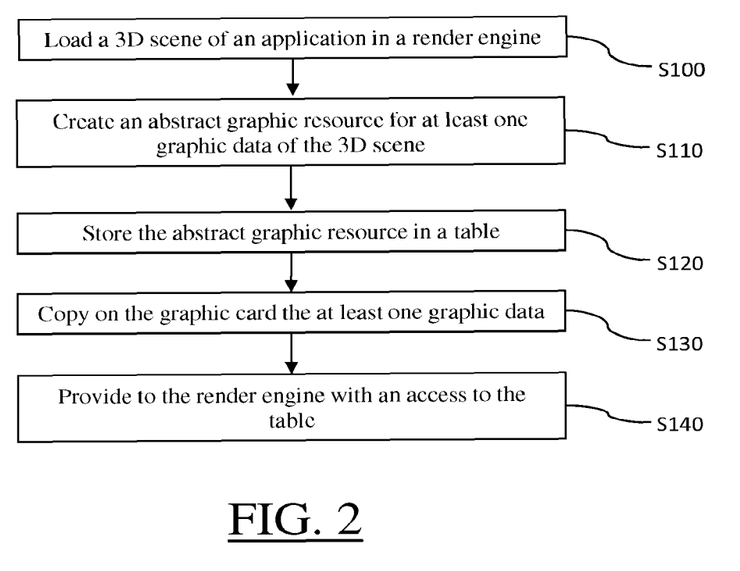
FIG. 2 shows a flowchart of an example of the invention.

With reference to the flowchart of FIG. 2, it is proposed a computer-implemented method for managing a plurality of Graphic Cards (GCs) used for rendering a scene. A GC can comprise one or more Graphic Processing Units (GPUs). The method comprises the loading of a scene in a Render Engine. The scene may be a three-dimensional (3D) scene. The scene comprises one or more graphic data to be used for rendering a view of the scene. The method further comprises creating an abstract graphic resource for the at least one graphic data. The abstract graphic resource stores an identifier of a graphic resource for at least one of graphic card. The method also comprises copying the said graphic resource of the said at least one of graphic data on the said at least one graphic card, e.g. on a memory of the graphic card. Then, the method comprises providing to the Render Engine (RE) an access to the abstract graphic resource for handling the said graphic resource.

Such a method improves the management of multiple Graphic Cards (GCs) while using current Graphic Libraries (GL). Notably, the present invention allows to bind a point of view to a specific GC thanks to the use of an abstract graphic resource that avoids a major issue, which is that, when a Graphic Resource (GR) is created by the Graphic Library for a given Graphic Card, the Graphic Resource gets a Graphic Card specific name which can be referred to as Resource Name. For instance, if an application draws a tree from two different points of view on two Graphic Cards, the Graphic Resource of the tree needs to be on both Graphic Card. On the first Graphic Card, the buffer will have a Resource Name N1 and in the second a Resource Name N2. This introduces a lot of complexity because each part of the Render Engine must handle this complexity and duplicate all rendering orders to deal with both Graphic Cards. Now, taking the same example with eight Graphic Cards, it becomes very tricky to manage the eight Resource Names for the single object "tree". In a typical scene, there are thousands of graphic objects, thus thousands times the number of Graphic Cards Resource Names to handle. The present invention uses an Abstract Graphic Resource for each Graphic Resources so that the Render Engine only manipulates an Abstract Graphic Resource for the graphic data, instead of manipulating a Resource Name. Hence, given that the Render Engine is given access to the Abstract Graphic Resource, each inner order (e.g. of an application requesting to the Render Engine a specific display) is modified by replacing the Graphic Card-specific Resource Name by its matching Abstract Handle. The Render Engine does no more deal with the above-mentioned complexity and does not need any more duplicating all rendering orders it receives. Additional advantages will be discussed hereinafter.

The method is computer-implemented. This means that the steps (or substantially all the steps) of the method are executed by at least one computer, or any system alike. Thus, steps of the method are performed by the computer, possibly fully automatically, or, semi-automatically. In examples, the triggering of at least some of the steps of the method may be performed through user-computer interaction. The level of user-computer interaction required may depend on the level of automatism foreseen and put in balance with the need to implement user's wishes. In examples, this level may be user-defined and/or pre-defined.

A typical example of computer-implementation of the method is to perform the method with a system adapted for this purpose. The system may comprise a processor coupled to a memory, and a plurality of graphic cards. A Render Engine and data representing a scene may be stored on the memory, and the Render Engine may run on the CPU. More generally, the memory may have recorded thereon a computer program comprising instructions for performing the method. The memory may also store a database. The memory is any hardware adapted for such storage, possibly comprising several physical distinct parts (e.g. one for the program, and possibly one for the database). By "database", it is meant any collection of data (i.e. information) organized for search and retrieval (e.g. a relational database, e.g. based on a predetermined structured language, e.g. SQL). When stored on a memory, the database allows a rapid search and retrieval by a computer. Databases are indeed structured to facilitate storage, retrieval, modification, and deletion of data in conjunction with various data-processing operations. The database may consist of a file or set of files that can be broken down into records, each of which consists of one or more fields. Fields are the basic units of data storage. Users may retrieve data primarily through queries. Using keywords and sorting commands, users can rapidly search, rearrange, group, and select the field in many records to retrieve or create reports on particular aggregates of data according to the rules of the database management system being used.

The method manipulates graphic data, e.g. a graphic data may be a modeled object. The modeled object may be defined by different kinds of data, e.g. CAD object, PLM object, PDM object, CAE object, CAM object, CAD data, PLM data, PDM data, CAM data, CAE data. The graphic data may be also For instance, in the context of a 3D scene obtained by using a CAD system, a modeled object may typically be a 3D modeled object, e.g. representing a product such as a part or an assembly of parts, or possibly an assembly of products. By "3D modeled object", it is meant any object which is modeled by data allowing its 3D representation. A 3D representation allows the viewing of the part from all angles. For example, a 3D modeled object, when 3D represented, may be handled and turned around any of its axes, or around any axis in the screen on which the representation is displayed. This notably excludes 2D icons, which are not 3D modeled. The display of a 3D representation facilitates design (i.e. increases the speed at which designers statistically accomplish their task). This speeds up the manufacturing process in the industry, as the design of the products is part of the manufacturing process. The 3D modeled object may represent the geometry of a product to be manufactured in the real world subsequent to the completion of its virtual design with for instance a CAD software solution or CAD system, such as a (e.g. mechanical) part or assembly of parts, or more generally any rigid body assembly (e.g. a mobile mechanism). A CAD software solution allows the design of products in various and unlimited industrial fields, including: aerospace, architecture, construction, consumer goods, high-tech devices, industrial equipment, transportation, marine, and/or offshore oil/gas production or transportation. The 3D modeled object designed by the method may thus represent an industrial product which may be any mechanical part, such as a part of a terrestrial vehicle (including e.g. car and light truck equipment, racing cars, motorcycles, truck and motor equipment, trucks and buses, trains), a part of an aerial vehicle (including e.g. airframe equipment, aerospace equipment, propulsion equipment, defense products, airline equipment, space equipment), a part of a naval vehicle (including e.g. navy equipment, commercial ships, offshore equipment, yachts and workboats, marine equipment), a general mechanical part (including e.g. industrial manufacturing machinery, heavy mobile machinery or equipment, installed equipment, industrial equipment product, fabricated metal product, tire manufacturing product), an electro-mechanical or electronic part (including e.g. consumer electronics, security and/or control and/or instrumentation products, computing and communication equipment, semiconductors, medical devices and equipment), a consumer good (including e.g. furniture, home and garden products, leisure goods, fashion products, hard goods retailers' products, soft goods retailers' products), a packaging (including e.g. food and beverage and tobacco, beauty and personal care, household product packaging).

By PLM, it is additionally meant any system adapted for the management of a modeled object representing a physical manufactured product (or product to be manufactured). In a PLM system, a modeled object is thus defined by data suitable for the manufacturing of a physical object. These may typically be dimension values and/or tolerance values. For a correct manufacturing of an object, it is indeed better to have such values.

By CAM, it is additionally meant any solution, software of hardware, adapted for managing the manufacturing data of a product. The manufacturing data generally includes data related to the product to manufacture, the manufacturing process and the required resources. A CAM solution is used to plan and optimize the whole manufacturing process of a product. For instance, it can provide the CAM users with information on the feasibility, the duration of a manufacturing process or the number of resources, such as specific robots, that may be used at a specific step of the manufacturing process; and thus allowing decision on management or required investment. CAM is a subsequent process after a CAD process and potential CAE process. Such CAM solutions are provided by Dassault Systèmes under the trademark DELMIA®.

By CAE, it is additionally meant any solution, software of hardware, adapted for the analysis of the physical behavior of modeled object. A well-known and widely used CAE technique is the Finite Element Method (FEM) which typically involves a division of a modeled objet into elements which physical behaviors can be computed and simulated through equations. Such CAE solutions are provided by Dassault Systèmes under the trademark SIMULIA®. Another growing CAE technique involves the modeling and analysis of complex systems composed a plurality components from different fields of physics without CAD geometry data. CAE solutions allows the simulation and thus the optimization, the improvement and the validation of products to manufacture. Such CAE solutions are provided by Dassault Systèmes under the trademark DYMOLA®.

PDM stands for Product Data Management. By PDM solution, it is meant any solution, software of hardware, adapted for managing all types of data related to a particular product. A PDM solution may be used by all actors involved in the lifecycle of a product: primarily engineers but also including project managers, finance people, sales people and buyers. A PDM solution is generally based on a product-oriented database. It allows the actors to share consistent data on their products and therefore prevents actors from using divergent data. Such PDM solutions are provided by Dassault Systèmes under the trademark ENOVIA®.

Figure 3:
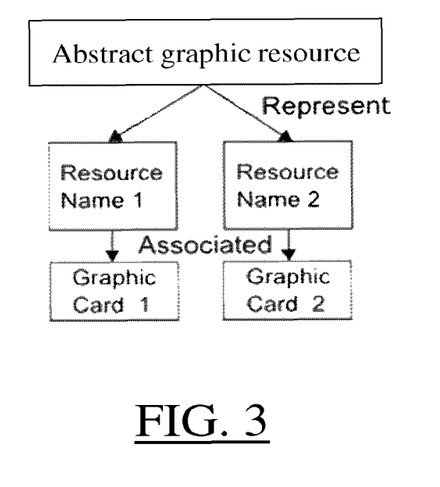
FIG. 3 shows an example of the creation of an abstract graphic resource.

FIG. 3 shows an example of a system; the system is a computer system, e.g. a workstation of a user.

The system of the example comprises a central processing unit (CPU) 1010 connected to an internal communication BUS 1000, a random access memory (RAM) 1070 also connected to the BUS. The system is further provided with a graphical processing unit (GPU) 1110 which is associated with a video random access memory 1100 connected to the BUS. Video RAM 1100 is also known in the art as frame buffer. A mass storage device controller 1020 manages accesses to a mass memory device, such as hard drive 1030. Mass memory devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks 1040. Any of the foregoing may be supplemented by, or incorporated in, specially designed ASICs (application-specific integrated circuits). A network adapter 1050 manages accesses to a network 1060. The system may also include a haptic device 1090 such as cursor control device, a keyboard or the like. A cursor control device is used in the system to permit the user to selectively position a cursor at any desired location on display 1080. In addition, the cursor control device allows the user to select various commands, and input control signals. The cursor control device includes a number of signal generation devices for input control signals to system. Typically, a cursor control device may be a mouse, the button of the mouse being used to generate the signals. Alternatively or additionally, the system may comprise a sensitive pad, and/or a sensitive screen.

The computer program may comprise instructions executable by a computer, e.g. the system of FIG. 3. The instructions of the computer program cause the above system to perform the method. The program may be recordable on any data storage medium, including the memory of the system. The program may for example be implemented in digital electronic circuitry, or in computer hardware, firmware, software, or in combinations of them. The program may be implemented as an apparatus, for example a product tangibly embodied in a machine-readable storage device for execution by a programmable processor. Method steps may be performed by a programmable processor executing a program of instructions to perform functions of the method by operating on input data and generating output. The processor may thus be programmable and coupled to receive data and instructions from, and to transmit data and instructions to, a data storage system, at least one input device, and at least one output device. The application program may be implemented in a high-level procedural or object-oriented programming language, or in assembly or machine language if desired. In any case, the language may be a compiled or interpreted language. The program may be a full installation program or an update program. Application of the program on the system results in any case in instructions for performing the method.

Referring back to the flowchart of FIG. 2, it is discussed an example of the computer-implemented method for managing a plurality of Graphic Cards according to the invention.

A step S100, a three-dimensional scene is loaded in a Render Engine (RE). A Render Engine (also referred to as Rendering Engine) is a framework that generates images to be displayed upon application's request. For instance, a CAD application of CAD system provides to the Render Engine a 3D scene of 3D modeled objects as input and the Render Engine draws the 3D scene to the screen with the use of one or more Graphic Cards of the CAD system. The framework is implemented as a software component that takes as input data that an application requests to be displayed and that outputs images that can be displayed.

A typical Render Engine contains several logical layers of code for hiding the implementation details of the Render Engine, as known in the art. Each layer provides a set of functionality and interfaces for communicating with other layers, hardware component of the system, or an application executed by the system. The number of logical layer may vary. The upper layer n relies on the layer n−1 and so on. A layer n−1 is closer to the hardware than a layer n.

In an example of the invention, the Render Engine comprises at least three logical layers; namely an upper, a lower and abstract layers. The upper layer aims at providing to an application (e.g. a CAD application) with access to the Render Engine, e.g. the upper layer comprises interfaces such API. The upper layer can be accessed by application itself to provide the 3D scene to the Render Engine. The lower layer provides the Render Engine with an access to the Graphic Library that is a computer program library designed to aid in rendering computer graphics to a display, as known in the art. The abstract layer is between the upper and lower layers and aims at managing Abstract Graphic Resource created at step S110. Only the lowest layer has access to the Resource Names of the Graphic Resources, and only the upper layer deals with the Abstract Graphic Resource(s).

The Render Engine is typically a computer program that is referred to as Render Engine computer program. The Render Engine is therefore executed when the steps of the method are carried out.

Loading the 3D scene in the Render Engine means that the data (e.g. a file) representing the 3D scene is provided to the Render Engine, that is, the Render Engine can access the data and perform computation on it. The expression 3D scene means a 3D space in which at least one 3D model is placed. For a system standpoint, a scene is a file that comprises at least one Graphic Data to be used for rendering a view of the 3D scene.

Next, at step S110, an Abstract Graphic Resource is created for the at least one graphic data of the 3D scene loaded at step S100. The creation may be performed by the abstract layer discussed previously. The Abstract Graphic Resource stores an identifier of a Graphic Resource for at least one of Graphic Card. The Graphic Resource is a data displayable by the Graphic Card: it is computed by the Graphic Library from the Graphic data previously loaded. The transformation of the graphic data into a Graphic Resource is carried out as known in the art. A Graphic Data is typically a binary asset storing a geometry to be displayed and it may further comprise optional parameters for describing this geometry such as texture, buffer, lighting, shading information, viewpoint . . . . From a Graphic Library standpoint, a Graphic Resource can be, but is not limited to, a geometry, a buffer, a texture, a framebuffer, a sampler, a shader, viewpoint . . . . The scene comprises at least one Graphic Data to be used for rendering a view of the scene, being understood that a typical scene generally comprises thousands of Graphic Data.

Thus, the step S110 comprises performing an identification of the same Graphic Resource (of the graphic data of the loaded scene) for each Graphic Card of the system, and the set of identified Graphic Resources is itself identified with the Abstract Graphic Resource that acts as a unique identifier of said Graphic Resource.

The Abstract Graphic Resource created a step S110 stores a unique identifier of the Graphic Resource on each Graphic Card of the system. In practice, the Abstract Graphic Resource may further store an identifier for each Graphic Card of the system. The identifier for each Graphic Card may be unique. Hence, the Abstract Graphic Resource handles the identifiers of the Graphics Resources together with the identifiers of the Graphic Cards on which the Graphic Resources are loaded. The identifiers may be, but are not limited to, digits, alphanumeric characters . . . . For instance, each Graphic Cards may be bounded to a key implemented as an integer: its numerical value is 1 for the Graphic Card 1, 2 for the Graphic Card 2, n for the Graphic Card n, and so on.

The identifiers of the Graphic Resources are obtained upon queries of the Render Engine on the Graphic Library. In an example, the lower layer of the Render Engine accesses the Graphic Library that has created the Graphic Resource, and the Graphic Library provides the identifier of the graphic resource on one of the Graphic Cards of the system. Once the lower layer has obtained the identifier, it is provided to the abstract layer. Preferably, all the identifiers of a given Graphic Resource are queried at once for improving the creation speed of the Abstract Graphic Resource.

In practice, the identifier of a Graphic Resource on a Graphic Card is also referred to as Resource Name. The Resource Name is created by the Graphic Library at the time the Graphic Data is transformed into Graphic Resource.

Next, at step S120, the Abstract Graphic Resource is stored in a table, e.g. the table is stored on a memory of the system. The table may be already existing; in this case, the table is completed with the new Abstract Graphic Resource. In the event no table exists, then it is created first (that is, the table is available in memory) and then completed with the new Abstract Graphic Resource. In practice, the Render Engine is a software that when executed is loaded in memory, and the executed Render Engine comes with a table for storing Abstract Graphic Resources. Thus, the Render Engine will be provided with an access (S140) to the table that stores the Abstract Graphic Resources created as a result of the loading of the 3D scene. By this way, the Render Engine is able to handle (or manage) the graphic data of the 3D scene.

Then, at step S130, the Graphic Resource (that is now identified on each Graphic Card of the system through the Abstract Graphic Resource) is copied on each Graphic Card of the system. It is to be understood that the information copied on a Graphic Card can be exploited by said Graphic Card, that is, the Graphic Resource is an object furnished by the Graphic Library on which operations can be performed by at least one Graphical Processing Unit of the Graphic Card. The copy of a Graphic resource to a graphic card is performed as known in the art, e.g. the graphic resource is stored on memory of the Graphic Card. And at step S340, the Render Engine can an access to the table that stores the Abstract Graphic Resources created as a result of the loading of the 3D scene.

Figure 4:
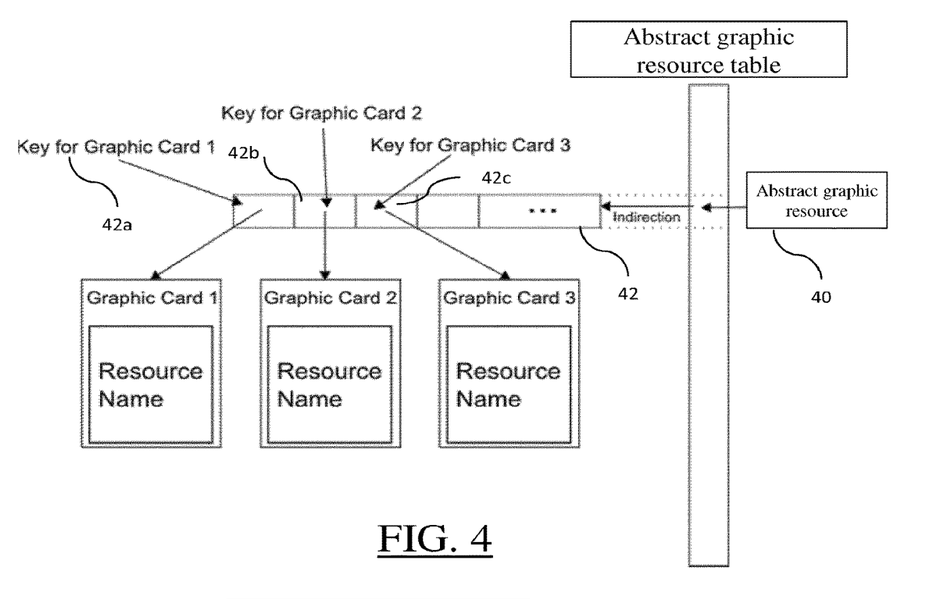
FIG. 4 shows an example of a table for management of abstract graphic resources.
Figure 5:
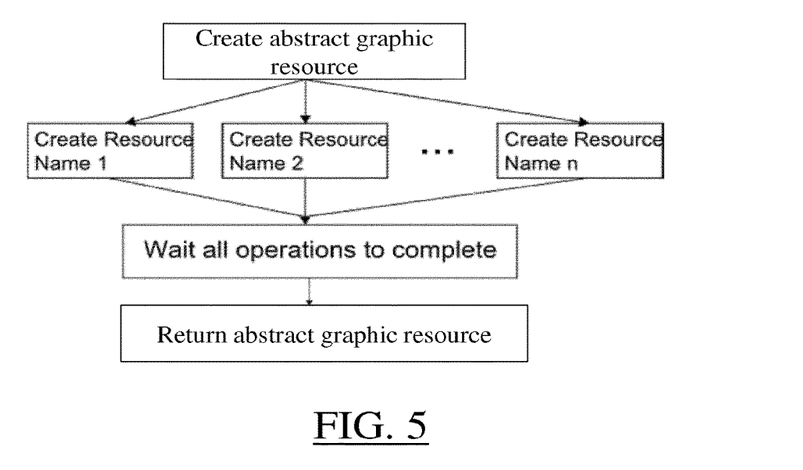
FIG. 5 shows an example of operations performed on graphic data.
Figure 6:
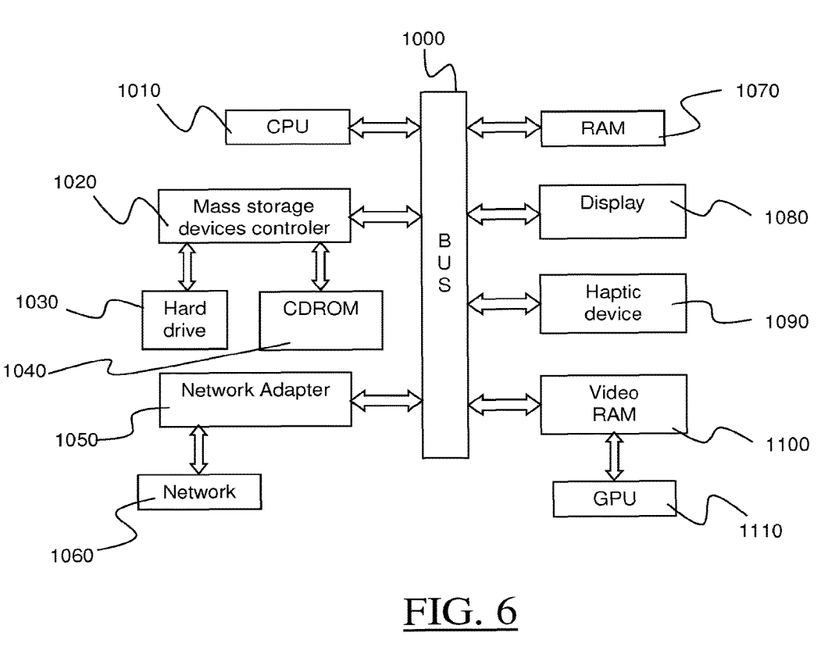
FIG. 6 shows an example of a computer system.

Referring now to FIGS. 3 to 5, it is discussed an example of steps S100 to S130 when the Render Engine receives an order of an application. A Render Engine order is a command that the Render Engine must execute. An order can be for example to draw a geometry or clear the screen with a specific color. An order can come from a user (e.g. through an application preforming display requests) using the Render Engine or directly from the Render Engine depending on how the Render Engine is structured. In a common Render Engine, an order is typically composed of an action (Draw, Clear . . . ) and one or more Resource Names that identify Graphic Resources (for example the geometry Graphic Resource to draw). In the present invention, the abstract layer of the Render Engine replaces in an order to be executed the Resource Name of the Graphic Resource by the Abstract Graphic Resource associated to the Graphic Resource. The order will be executed according to the number of Graphic Cards of the system. For instance, if the system comprises eight Graphic Cards, the order will be executed eight times; one execution for one Graphic Card.

In FIG. 3, the relationships between the Abstract Graphic Resource, the Resource Names and Graphic Cards are represented. A Graphic Data has been loaded (when loading the 3D scene) on the Render Engine upon application's request. An Abstract Graphic Resource has been created as a result of the loading of the Graphic Data. The Abstract Graphic Resource represents the Graphic Resource (computed by the Graphic Library from the loaded Graphic Data) on two Graphic Cards of the computer system: the Graphic Card 1 and the Graphic Card 2. Each Graphic Resource has a unique identifier also referred to as Resource Name; here the Graphic Resource has a Resource Name 1 on the Graphic Card 1 and a Resource Name 2 on the Graphic Card 2. It is to be understood that the copy of Graphic Resource on the Graphic Cards might be performed before the creation of the Abstract Graphic Resource; that is, step S130 is performed before step S110. Performing step S110 before step S130 improves the association of the Graphic resources on the Graphic Cards and also the creation and management of the Abstract Graphic Resource.

FIG. 5 shows the steps performed when a Graphic Data is loaded to the Render Engine. The created Abstract Graphic Resource represents the n Resource Names of the Graphic Resource, each Resource Name being associated with one of the n Graphic Cards. The Graphics Resources are copied on the Graphic Cards. Once the copy is finished (step S130), the Abstract Graphic Resource previously created (step S120) is returned to the application. The use of the Abstract Graphic Resource instead of a Resource Name is transparent for the application that is not aware that the Abstract Graphic Resource represents more than one Graphic Resource. Thus no modification of the application is required, the creation/management of the Abstract Graphic Resource being performed by the abstract layer of the Render Engine. The abstract layer may be configured to provide to the upper layer the abstract graphic resource that was created. By this way the application can be directly informed of the creation of the new Abstract Graphic Resource via the upper layer the application can access. This allows hiding the complexity of the graphic cards management and working as if there were only one graphic card in the system.

Referring now to FIG. 4, an example of an architecture used for storing and managing the created Abstract Graphic Resource is now depicted. The architecture of this example is similar to a double entry tabular with Abstract Graphic Resources that are used to search the good row of the table, and the Graphic Card identifiers (also referred to as Key for Graphic Card) are used to search the good column of the table. For instance, the abstract handle 40 allows to identify the row 42 of the table that comprises several columns 42a-42c, each column storing one Graphic Cards identifiers. Now, from the columns, it is possible to obtain all Resource Names (that is, the Resource Name on each Graphic Card) of the Graphic Resource. In practice, the Resource Name can be stored on the table, e.g. on the rows 42a-42c together with the Graphic Cards' identifiers.

An example of Abstract Graphic Resource creation and use for displaying a 3D scene with two different points of view is now discussed. In this example, the system comprises two graphic Cards, and each Graphic Card will be in charge of displaying the 3D scene with one point of view. After an application requested the Render Engine to display the 3D scene with two different points of view, a Graphic Library order (also referred to as Graphic Library action) is received by the Render Engine. As seen previously, a viewpoint on a scene is a Graphic Resource is an object furnished by the Graphic Library and on which operations can be performed. And this viewpoint Graphic Resource can be requested by the application by sending an order to the Render Engine. In the example discussed, the application sends an order requesting two viewpoints on the same scene. The upper layer of the Render Engine is typically responsible of receiving orders of the application; said otherwise, the application has an access to the Render Engine via the upper layer. Once the order has been received, the Render Engine identifies the Abstract Graphic Resource that is concerned by this order, e.g. in the Abstract Graphic Resource is searched in the table. In practice, this is made possible because the Render Engine has provided to the application the Abstract Graphic Resource associated to the loaded Graphic data. The table row of the Abstract Graphic Resource is traversed in order to obtain the Resources Names on all the Graphic Cards: the Graphic Resources being known, the order can be executed by replacing in the order the Abstract Graphic Resource by the corresponding Resource Name. It is to be understood that the order is executed for each Graphic Card with the Resource Name of the Graphic resource stored on said each Graphic Card.

The deletion of an Abstract Graphic Resource is performed in a similar manner. The application sends to the Render Engine an order of deleting a Graphic Data. The order (or action) is received by the Render Engine as the application can access said Render Engine, e.g. through the upper layer of the Render Engine. The order is addressed to the Abstract Graphic Resource as the application identifies the Graphic Data (copied as Graphic Resources on the Graphic Cards) with the Abstract Graphic Resource. The Render Engine then queries the Abstract graphic resource table and identifies the identifiers of the Graphic Resources on the Graphic Cards of the system. The order can now be modified by replacing the Abstract Graphic Resource by the Graphic Resource found in the table, a new order been created for each Graphic Resource associated with the Abstract Graphic Resource. As a result, the delete order can be executed and the Graphic Resource erased of the Graphic Card memory.

The examples of the invention presented hereinabove only contemplate scenarios in which all the Graphics Cards are involved in the display of the Graphic Data. Interestingly, the present invention further allows the application to select one or more Graphic Cards among the Graphics Cards of the system that are involved in the display process. The selection by the application of the number of Graphic Cards may depends on one or more parameters, e.g. the computing resources (e.g. on GPU) required for displaying the Graphic Data. The selection may also be configured upon user action, e.g. the user configures the application so that the number of Graphic Cards that are used for rendering the Graphic Data does not exceed a predetermined number. For the scenario in which one or more Graphic Cards among the Graphics Cards of the system are used, the Render Engine is informed by the application by use of a specific order that configures the Render Engine. The Render Engine may be configured to use a limited number of Graphic Cards for all the Graphic Data, or for one or more specific Graphic Data. This selection of at least one graphic card for handling at least one graphic data is performed before the abstract resource is created so that only the Graphic Cards involved in the rendering will be identified in the row of the Abstract Graphic resource associated with the Graphic Resource to display. Thus, the present invention allows to significantly improve the management a multi-graphic cards system and thus improve the rendering of scene; notably, rendering simultaneously viewpoints on a 3D scene is possible without modifying the application or the Graphic Library.

The invention claimed is:

1. A computer-implemented method for managing a plurality of graphic cards, a graphic card comprising one or more graphic processing units, comprising:
   loading a scene in a Render Engine, the scene comprising at least one graphic data to be used for rendering a view of the scene, the render engine comprising at least two logical layers, an upper layer providing an application with access to the Render Engine and a lower layer providing the Render Engine with access to a graphic library;
   creating an abstract graphic resource for a graphic resource of the at least one graphic data, the abstract graphic resource storing an identifier of the graphic resource for at least one of graphic card and the abstract graphic resource representing more than one graphic resource, the creation of the abstract graphic resource being performed by an abstract layer included between the upper layer and the lower layer;
   copying, on the said at least one graphic card, the said graphic resource of the at least one graphic data; and
   providing to the Render Engine with an access to the abstract graphic resource for handling the said graphic resource.

2. The computer-implemented method of claim 1, further comprising, before the creation of the abstract graphic resource:
   accessing on a graphic library, by the lower layer, the identifier of the graphic resource for the at least one of graphic cards; and
   providing the accessed identifier to the abstract layer.

3. The computer-implemented method of claim 1, wherein the created abstract graphic resource stores the identifier of a graphic resource and an identifier of the at least one of graphic card.

4. The computer-implemented method of claim 1, wherein the step of creating the abstract graphic resource further comprises storing the abstract graphic resource in a table, and
   wherein the step of providing to the Render Engine with an access comprises providing to the Render Engine with an access to the table that stores the abstract graphic resource for handling the said graphic resource.

5. The computer-implemented method of claim 1, further comprising:

receiving a graphic library action to be executed on the said graphic resource, the action being required by an application with access to the Render Engine;

identifying the abstract graphic resource created for the said graphic resource;

retrieving the identifier of the graphic resource for at least one of graphic card; and accessing the graphic resource and executing the graphic library action on the graphic resource.

6. The computer-implemented method of claim 1, further comprising:

receiving an order to deleted the said graphic resource, the action being required by an application with access to the Render Engine;

identifying the abstract graphic resource created for the said graphic resource;

retrieving the identifier of the graphic resource for the at least one of graphic card; and accessing the graphic resource and deleting the graphic resource of the at least one of graphic card.

7. The computer-implemented method of claim 1, further comprising:

providing to the upper layer the abstract graphic resource.

8. The computer-implemented method of claim 1, further comprising, before creating an abstract resource:

selecting the at least one graphic card for handling the said graphic resource to be used.

9. The computer-implemented method of claim 1, wherein the abstract graphic resource stores an identifier of a graphic resource for each graphic card of the plurality of graphic cards, and wherein graphic resource is copied on each graphic card of the plurality of graphic cards.

10. A Render Engine computer program comprising instructions for performing the method of claim 1.

11. A non-transitory computer readable storage medium having recorded thereon a Render Engine computer program that when executed by a computer causes the computer to implement a method for managing a plurality of graphic cards, a graphic card comprising one or more graphic processing units, the method comprising:

loading a scene in a Render Engine, the scene comprising at least one graphic data to be used for rendering a view of the scene, the render engine comprising at least two logical layers, an upper layer providing an application with access to the Render Engine and a lower layer providing the Render Engine with access to a graphic library;

creating an abstract graphic resource for a graphic resource of the at least one graphic data, the abstract graphic resource storing an identifier of the graphic resource for at least one of graphic card and the abstract graphic resource representing more than one graphic resource, the creation of the abstract graphic resource being performed by an abstract layer included between the upper layer and the lower layer;

copying, on the said at least one graphic card, the said graphic resource of the at least one graphic data; and providing to the Render Engine with an access to the abstract graphic resource for handling the said graphic resource.

12. A system comprising:

processing circuitry coupled to a memory and a graphical user interface, the memory having recorded thereon the Render Engine computer program for managing a plurality of graphic cards, a graphic card comprising one or more graphic processing units, that when executed by the processing circuitry to be configured to load a scene in a Render Engine, the scene comprising at least one graphic data to be used for rendering a view of the scene, the render engine comprising at least two logical layers, an upper layer providing an application with access to the Render Engine and a lower layer providing the Render Engine with access to a graphic library, create an abstract graphic resource for a graphic resource of the at least one graphic data, the abstract graphic resource storing an identifier of the graphic resource for at least one of graphic card and the abstract graphic resource representing more than one graphic resource, the creation of the abstract graphic resource being performed by an abstract layer included between the upper layer and the lower layer, copy, on the said at least one graphic card, the said graphic resource of the at least one graphic data, and provide to the Render Engine with an access to the abstract graphic resource for handling the said graphic resource.

* * * * *